US012680629B2

(12) United States Patent
Cardwell et al.

(10) Patent No.: US 12,680,629 B2
(45) Date of Patent: Jul. 14, 2026

(54) ABRASION RESISTANT COATED TUBE

(71) Applicant: Cooper-Standard Automotive Inc., Northville, MI (US)

(72) Inventors: Brian J. Cardwell, Ypsilanti, MI (US); Thomas Breuer, Sinsheim-Adersbach (DE)

(73) Assignee: Cooper-Standard Automotive Inc., Northville, MI (US)

( * ) Notice: Subject to any disclaimer, the term of this patent is extended or adjusted under 35 U.S.C. 154(b) by 600 days.

(21) Appl. No.: 17/983,227

(22) Filed: Nov. 8, 2022

(65) Prior Publication Data

US 2023/0184353 A1    Jun. 15, 2023

Related U.S. Application Data

(60) Provisional application No. 63/289,847, filed on Dec. 15, 2021.

(51) Int. Cl.

| | |
|---|---|
| *F16L 9/147* | (2006.01) |
| *B05D 7/14* | (2006.01) |
| *C23C 22/78* | (2006.01) |
| *C25D 3/12* | (2006.01) |
| *C25D 3/38* | (2006.01) |
| *C25D 7/04* | (2006.01) |
| *F16L 57/06* | (2006.01) |
| *F16L 58/08* | (2006.01) |

(52) U.S. Cl.
CPC .............. *F16L 9/147* (2013.01); *B05D 7/146* (2013.01); *C23C 22/78* (2013.01); *C25D 3/12* (2013.01); *C25D 3/38* (2013.01); *C25D 7/04* (2013.01); *F16L 57/06* (2013.01); *F16L 58/08* (2013.01)

(58) Field of Classification Search
CPC ............ F16L 9/147; F16L 57/06; F16L 58/08
USPC ................................................. 138/146, 147
See application file for complete search history.

(56) References Cited

U.S. PATENT DOCUMENTS

| | | | | |
|---|---|---|---|---|
| 6,176,268 | B1 * | 1/2001 | Hsich .................... | B29C 48/151 |
| | | | | 977/788 |
| 10,281,078 | B2 | 5/2019 | Kawai et al. | |
| 10,337,660 | B2 | 7/2019 | Kawai et al. | |
| 2004/0035486 | A1 * | 2/2004 | Picco ...................... | F16L 9/147 |
| | | | | 138/146 |
| 2004/0058111 | A1 * | 3/2004 | Manas-Zloczower ....................... | B32B 27/08 |
| | | | | 138/125 |

(Continued)

OTHER PUBLICATIONS

Search Report and Written Opinion for EP 22213355.5 dated Mar. 13, 2023.

(Continued)

*Primary Examiner* — David R Deal
(74) *Attorney, Agent, or Firm* — Paschall & Associates, LLC; Mark Goldberg

(57) ABSTRACT

A coated metal pipe for use as an automotive fluid transport tube is provided comprising: a single or double walled tubing formed into a circular cross-sectional profile; at least one intermediate layer primer layer applied over said tubing: and an outer layer comprising a polyamide incorporating an immiscible additive. The immiscible additive is selected from Ultra High Molecular Weight (UHMW) silicones, UHMW polyethylene (UHMW-PE), polytetrafluoroethylene (PTFE) and mixtures thereof.

16 Claims, 1 Drawing Sheet

(56) References Cited

U.S. PATENT DOCUMENTS

| 2008/0006338 A1* | 1/2008 | Wideman | ............ F16L 11/081 |
| | | | 138/124 |
| 2014/0150916 A1* | 6/2014 | Abate | ...................... F16L 9/14 |
| | | | 138/145 |
| 2017/0130874 A1 | 5/2017 | Watanabe et al. | |
| 2018/0119871 A1* | 5/2018 | Kawai | ..................... C09D 5/08 |
| 2020/0041063 A1 | 2/2020 | Kerin, Jr. et al. | |
| 2022/0081564 A1* | 3/2022 | Buzinkai | ............. B32B 15/085 |

OTHER PUBLICATIONS

Product sheet for Multibase HMB-1103 Silicone Masterbatch, DuPont, Feb. 22, 2021.
DuPont Sell Sheet, Silicone-Based Additives for Polyamide Compounds, 2019.

* cited by examiner

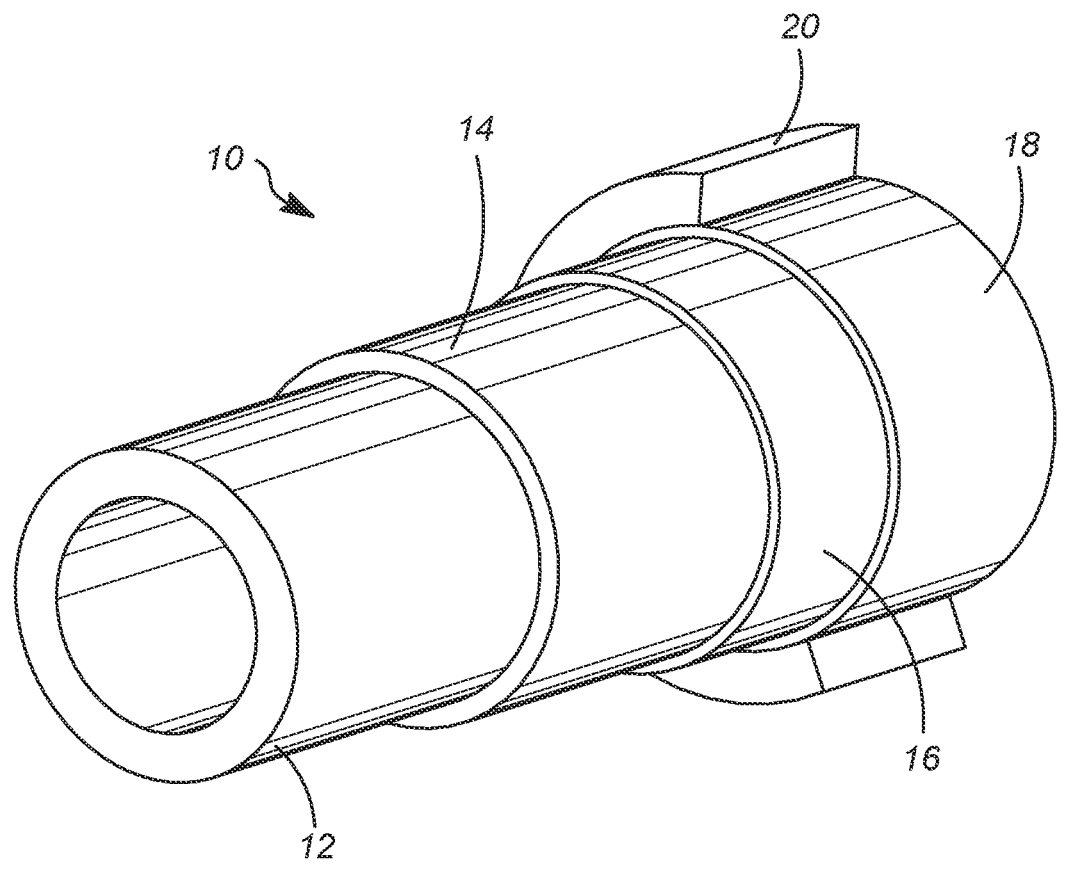

ABRASION RESISTANT COATED TUBE

This application claims priority to provisional application 63/289,847 filed Dec. 15, 2021, which is incorporated herein by reference in its entirety.

The present invention relates to a metal tube for vehicle piping and more specifically relates to a coated metal tube which is abrasion resistant. The tubes have a central steel tube that includes an outermost coating of a polyamide material incorporating a non-conductive additive to reduce the friction coefficient of the polyamide material.

BACKGROUND

Metallic tubes are typically coated with sacrificial metallic layers to protect the base steel tube against corrosion. A protective barrier layer of a non-metallic thermoplastic has been typically applied over the base steel tube. The thermoplastic may be in the form of a chemically resistant long-chain polyamide 12 or 6,12 thermoplastic or similar thermoplastic coating that is designed to be an unbroken layer to keep corrosive electrolytes from coming into direct contact with the metallic substrate under the thermoplastic coating. In order to maintain the protection from this layer, the polyamide layer itself must be resistant to chemicals (such as crack-inducing chloride salts), impact damage (stone pecking or chipping) as well as resistant to wear and abrasion from other objects contacting the surface. Current products add additional layers to the outer part of the tube (such as polypropylene) but this adds additional manufacturing steps and makes the diameter of the tubing (and the clips that hold the tubing) larger. It is therefore desirable to achieve increased performance from the existing polyamide layer without adding too much cost and not changing the basic application method for the polyamide layer.

Polyamide coatings are generally known to exhibit high wear resistant properties along and provide a liquid water barrier to the underlying metallic corrosion protective coatings. Coating thicknesses on steel tubes can vary significantly but application thicknesses in the area of 100 micrometers to 1 mm are not uncommon. Such coatings can further include either or both thermoset and thermoplastic compositions and are often used for finishing and protection of metal surfaces.

The prior art is documented with examples of automotive fluid tubing utilizing such coatings to provide varying performance characteristics. A first example of this is shown by the automotive fluid tubing of Picco et al., U.S. Pat. No. 6,915,820 which is configured for carrying any of gasoline/diesel fuel or hydraulic fluid and is composed of a metal with a coating of aluminum, over which is extrusion coated a polyamide 12 layer for improving the wear-resistance and corrosion-resistance of the tubing.

A further example of the prior art is found in Berger et al., U.S. Pat. No. 9,556,358 which teaches a method for coating of a metallic article, in which the metal surface is coated with a polymer or a two-component system that reacts to form a polymer following application to the metal surface. The composition includes a 70-2700 meq/kg olefinic double bonds which leads to stronger adhesion and to increased corrosion resistance.

US 2018/0119871, to Kawai, teaches a coated metal pipe in which the multilayered coating includes a chemical conversion layer and a primer layer which further includes a polyamide imide and at least one kind of additive component selected from a polyamide, a fluorine resin, a silane coupling agent, and an epoxy resin.

Another composition that has been proposed involves the addition of graphene additives to the polyamide to improve performance. However, this creates an electrically conductive coating which may not be optimal for resistance for stray current corrosion.

SUMMARY

The present invention discloses a coated metal pipe for use as an automotive fluid transport tube including any of a single or double walled tubing formed into a circular cross sectional profile. At least one intermediate primer layer is applied over the tubing. A polyamide incorporating an additive is further applied over the intermediate layer. The additives may include ultra high molecular weight silicones, ultrahigh molecular weight polyethylene, polytetrafluorethylene or mixtures of two or more of these additives.

Additional features include the polyamide layer further including any of a PA 6/12 or PA 12 sacrificial outer layer. The tubing may also include any of a copper plated low carbon steel, low carbon steel, stainless steel, or aluminum.

A nickel plating can be applied to an inner diameter of the tubing. The intermediate diameter may also include a corrosion inhibiting zinc/aluminum alloy or other corrosion inhibiting material. The intermediate layer can further include a chrome free conversion coating, primer or primer/adhesive coating, or passivation coating copper coating or other suitable coating.

In an embodiment is provided a coated metal pipe for use as an automotive fluid transport tube comprising a single or double walled tubing formed into a circular cross-sectional profile; at least one intermediate layer primer layer applied over the tubing: and an outer layer comprising a polyamide incorporating an immiscible additive. The immiscible additive may be selected from Ultra High Molecular Weight (UHMW) silicones, UHMW polyethylene (UHMW-PE), polytetrafluoroethylene (PTFE) and mixtures thereof. The polyamide layer may comprise a PA6/12 or PA 12 sacrificial outer layer. The tubing may comprise steel or any of a copper plated low carbon steel, low carbon steel, stainless steel, or aluminum. There may be a nickel plating applied to an inner diameter of the tubing. There may be an intermediate layer further comprising a corrosion inhibiting zinc/aluminum alloy or a corrosion inhibiting magnesium alloy further comprising one or more of aluminum, zinc, manganese, silicon, copper, rare earth metals or zirconium. The intermediate layer may be a chrome free conversion coating, primer or primer/adhesive coating, or passivation coating copper coating.

In another embodiment, the coated metal pipe for use as an automotive fluid transport tube, comprises a copper plated carbon steel tubing formed into a circular cross-sectional profile; at least one intermediate primer layer including a corrosion inhibiting alloy applied over said tubing; and an outer polyamide layer applied over the intermediate layer, the outer layer compounded with an immiscible additive that is selected from Ultra High Molecular Weight (UHMW) silicones, UHMW polyethylene (UHMW-PE), polytetrafluoroethylene (PTFE) and mixtures thereof at 1-15% by weight. The polyamide layer may further comprise any of a PA 6/12 or PA 12 sacrificial outer layer. There may be nickel plating applied to an inner diameter of said tubing. The intermediate layer may be selected from a group consisting of a chrome free conversion coating, primer or primer/adhesive coating, or passivation coating copper coating or a corrosion inhibiting magnesium alloy further comprising one or more of aluminum, zinc, manganese, silicon, copper, rare earth metals or zirconium.

Another embodiment of the invention is a method for manufacturing a coated metal pipe for use as an automotive fluid transport tube, comprising the steps of: forming a copper plated carbon steel into a tubing exhibiting a circular cross-sectional profile; forming at least one intermediate primer layer including a corrosion inhibiting zinc/aluminum alloy applied over the tubing; and forming an outer polyamide layer applied over the intermediate layer, the outer layer compounded with an immiscible additive at 1-15% by weight. A step of applying a nickel plating to an inner diameter of the tubing may also be taken. The intermediate layer being selected from a group consisting of a chrome free conversion coating, primer or primer/adhesive coating, or passivation coating copper coating or a corrosion inhibiting magnesium alloy further comprising one or more of aluminum, zinc, manganese, silicon, copper, rare earth metals or zirconium. The polyamide layer may be selected from a group consisting of a PA 6/12 or PA 12 sacrificial outer layer. A further step involves applying the chrome free conversion coating at a thickness of 0.2-04 micrometers.

BRIEF DESCRIPTION OF THE DRAWING

Reference will now be made to the attached drawings, when read in combination with the following detailed description, wherein like reference numerals refer to like parts throughout the several views, and in which:

The FIGURE is a length cutaway illustration of a wall segment of an automotive fluid transport tube according to a non-limiting embodiment.

DETAILED DESCRIPTION

With non-limiting reference to the submitted drawing, the FIGURE, the present invention teaches an automotive fluid transport tube of varying compositions, each of which being coated with a corrosion, abrasion and impact resistant multi-layer or mono coating system. The present invention also teaches a related method of manufacturing any tube covered under the present system, article or assembly. In each variant disclosed, the tubes include an outermost coating of a polyamide material incorporating an additive providing high wear resistance and superior insulating properties. For purposes of the present invention, the various ranges of coating thickness described subsequently herein are understood to represent preferred but non-limiting embodiments, and it is envisioned that other ranges can be employed unless otherwise indicated.

Referring initially to the FIGURE, a length cutaway illustration is generally shown at 10 of a wall segment of an automotive fluid transport tube according to a first non-limiting embodiment. The variant 10 of FIG. 1 includes a plurality of five layers and depicts a first layer 12 of a copper plated low carbon steel roll formed and brazed double wall tubing. The first layer can be further nickel coated on its inner diameter (reference being subsequently made to the FIGURE). A second layer 14 of a hot dipped zinc/aluminum (Galfan) alloy, such as applied at 5-12 micrometer (one millionth of a meter) thickness is applied over the first layer 12.

A third layer 16 of a chrome free conversion coating (such as applied at a non-limiting thickness range of 0.2-0.4 micrometer) is applied over the third layer. A fourth layer 18 of a primer coating (3 micrometer) is applied. Finally, a fifth layer 20 of a polyamide (e.g. including either of a PA 612 or PA 12) or another polyamide multi or mono sacrificial wall layer is applied, that is reinforced with an additive.

Without limitation, the outer layer 20 is further to be combined with a non-conductive additive or filler such as Ultra High Molecular Weight (UHMW) silicones, UHMW Polyethylene (UHMW-PE), or/and Polytetrafluoroethylene (PTFE), is compounded with the polyamide at about 1-15 percent by weight loading. The purpose of the additive is to provide superior properties to the polyamide material produced such that it exhibits some improved properties such as improved mechanical properties, enhanced barrier resistance (such as protecting the interior of the tubing of heat/cold temperature extremes as well as establishing hydrophobic properties), as well as increased impact resistance to the steel tubing. The additive may be disbursed in a compatible carrier resin (master batch) which is diluted with the polyamide resin at an extruder to produce a coating. As an example, UHMW Silicone may be added at a 3% masterbatch to produce a more abrasion resistant coating. The UHMW silicones that may be used include a material sold by DuPont as DuPont MULTIBASE™ HMB-1103 Masterbatch as well as similar materials.

As is known, polyamides are both naturally and artificially and reference a macromolecule with repeating units linked by amide bonds. All polyamides are made by the formation of an amide function to link two molecules of monomer together. Polyamides are easily copolymerized, and thus many mixtures of monomers are possible which can in turn lead to many copolymers. Additionally, many nylon polymers are miscible with one another allowing the creation of blends. Characteristically polyamides (nylons) are fairly resistant to wear and abrasion, have good mechanical properties even at elevated temperatures, have low permeability to gases and have good chemical resistance. Nylon is a designation for a family of synthetic polymers, based on aliphatic or semi-aromatic polyamides.

Polyamide (PA) 12 polymers are known for performance properties including their being easy to process in standard extrusion or injection molding equipment, light weight, excellent noise dampening and elimination of vibration, good chemical resistance, low water absorption, outstanding impact properties and flexibility (especially at lower temperatures), enhanced abrasion resistance and resistance to stress cracking.

Related nylon 6/12 (PA) Polyamide 6/12 polymers (also referred to as polyamide 612) provide the similar properties of low water absorbing nylon, strength, heat resistance, chemical resistance, wear resistance and lubricity. The numerical nomenclature for nylon is derived from the number of carbon atoms in the diamine and dibasic acid monomers used to manufacture it. The ratio of carbon atoms is what gives each nylon type its unique property characteristics.

Nylon 6/12 was developed as a low moisture absorbing nylon. The low moisture absorption characteristics are derived from its chemical structure; the greater the number of carbon atoms separating the amine groups, the lower the moisture absorbed. With lower moisture absorption, nylon 6/12 does not swell like nylon 6 or nylon 6/6. The reduction in moisture absorption results in a polymer with less ductility than nylon 6 or nylon 6/6. The physical properties and HDT of the polymer are also lower due to reduced crystallinity on the polymer.

Like other nylons, nylon 6/12 is very easily modified to improve wear resistance and physical properties via fiber reinforcement and internal lubricants. Nylon 6/12 compounds are used in a wide range of applications including gears, cams, structural, and electrical components. As such, Nylon 6/12 is an excellent candidate material for applications requiring good physical properties, high heat resistance, moisture and chemical resistance and good dimensional stability.

The coated metal pipes passed piano wire abrasion testing as a result of a reduced friction coefficient in the outer coating that included the silicone filled polyaramide. The best results were found with an outer layer containing polyaramide and polypropylene. The testing that was performed consisted of checking for wear from the contact of tools constructed of two separate materials (plastic, such as a glass filled PA66 and metal such as a length of piano wire). Two different motions of abrasion were evaluated and independent tests were at both room temperature of 23 C and an elevated temperature of 80 C.

SPECIFIC EMBODIMENTS

While the following is described in conjunction with specific embodiments, it will be understood that this description is intended to illustrate and not limit the scope of the preceding description and the appended claims.

A first embodiment of the disclosure is a coated metal pipe for use as an automotive fluid transport tube comprising a single or double walled tubing formed into a circular cross-sectional profile; at least one intermediate layer primer layer applied over said tubing: and an outer layer comprising a polyamide incorporating an immiscible additive. An embodiment of the disclosure is one, any or all of prior embodiments in this paragraph up through the first embodiment in this paragraph wherein the immiscible additive is selected from Ultra High Molecular Weight (UHMW) silicones, UHMW polyethylene (UHMW-PE), polytetrafluoroethylene (PTFE) and mixtures thereof. An embodiment of the disclosure is one, any or all of prior embodiments in this paragraph up through the first embodiment in this paragraph wherein the polyamide layer further comprises any of a PA11, PA6,10, PA6/12 or PA 12 sacrificial outer layer. An embodiment of the disclosure is one, any or all of prior embodiments in this paragraph up through the first embodiment in this paragraph wherein the tubing comprises steel. An embodiment of the disclosure is one, any or all of prior embodiments in this paragraph up through the first embodiment in this paragraph wherein the tubing further comprises any of a copper plated low carbon steel, low carbon steel, stainless steel, or aluminum. An embodiment of the disclosure is one, any or all of prior embodiments in this paragraph up through the first embodiment in this paragraph wherein the coated metal pipe further comprises a nickel plating applied to an inner diameter of the tubing. An embodiment of the disclosure is one, any or all of prior embodiments in this paragraph up through the first embodiment in this paragraph further wherein the intermediate layer is further comprising a corrosion inhibiting zinc/aluminum alloy or a corrosion inhibiting magnesium alloy further comprising one or more of aluminum, zinc, manganese, silicon, copper, rare earth metals or zirconium. An embodiment of the disclosure is one, any or all of prior embodiments in this paragraph up through the first embodiment in this paragraph further comprising the intermediate layer being selected from a group consisting of a chrome free conversion coating, primer or primer/adhesive coating, or passivation coating copper coating.

A second embodiment of the disclosure is a coated metal pipe for use as an automotive fluid transport tube, comprising a copper plated carbon steel tubing formed into a circular cross-sectional profile; at least one intermediate primer layer including a corrosion inhibiting alloy applied over said tubing; and an outer polyamide layer applied over said intermediate layer, said outer layer compounded with an immiscible additive is selected from Ultra High Molecular Weight (UHMW) silicones, UHMW polyethylene (UHMW-PE), polytetrafluoroethylene (PTFE) and mixtures thereof at 1-15% by weight. An embodiment of the disclosure is one, any or all of prior embodiments in this paragraph up through the second embodiment in this paragraph wherein the polyamide layer IS further comprising any of a PA 6/12, PA6/10, PA11 or PA 12 sacrificial outer layer. An embodiment of the disclosure is one, any or all of prior embodiments in this paragraph up through the second embodiment in this paragraph wherein the coated metal pipe is further comprising a nickel plating applied to an inner diameter of said tubing. An embodiment of the disclosure is one, any or all of prior embodiments in this paragraph up through the second embodiment in this paragraph wherein the coated metal pipe is further comprising the intermediate layer being selected from a group consisting of a chrome free conversion coating, primer or primer/adhesive coating, or passivation coating copper coating or a corrosion inhibiting magnesium alloy further comprising one or more of aluminum, zinc, manganese, silicon, copper, rare earth metals or zirconium.

A third embodiment of the disclosure is a method for manufacturing a coated metal pipe for use as an automotive fluid transport tube, comprising the steps of:

forming a copper plated carbon steel into a tubing exhibiting a circular cross-sectional profile;

forming at least one intermediate primer layer including a corrosion inhibiting zinc/aluminum alloy applied over the tubing; and forming an outer polyamide layer applied over the intermediate layer, the outer layer compounded with an immiscible additive at 1-15% by weight. An embodiment of the disclosure is one, any or all of prior embodiments in this paragraph up through the third embodiment in this paragraph wherein the method is further comprising the step of applying a nickel plating to an inner diameter of the tubing. An embodiment of the disclosure is one, any or all of prior embodiments in this paragraph up through the third embodiment in this paragraph wherein the method is further comprising the step of the intermediate layer being selected from a group consisting of a chrome free conversion coating, primer or primer/adhesive coating, or passivation coating copper coating or a corrosion inhibiting magnesium alloy further comprising one or more of aluminum, zinc, manganese, silicon, copper, rare earth metals or zirconium. An embodiment of the disclosure is one, any or all of prior embodiments in this paragraph up through the third embodiment in this paragraph wherein the method is further comprising the step of the polyamide layer selected from a group consisting of a PA 6/12, PA6/10, PA11 or PA 12 sacrificial outer layer. An embodiment of the disclosure is one, any or all of prior embodiments in this paragraph up through the third embodiment in this paragraph wherein the method is further comprising the step of applying the chrome free conversion coating at a thickness of 0.2-04 micrometers.

The invention claimed is:

1. A coated metal pipe for use as an automotive fluid transport tube comprising:

a single or double walled tubing formed into a circular cross-sectional profile;

at least one intermediate layer primer layer applied over said tubing; and an outer layer comprising a polyamide incorporating an immiscible additive selected from Ultra High Molecular Weight (UHMW) silicones and UHMW polyethylene (UHMW-PE).

2. The coated metal pipe of claim 1, said polyamide layer further comprising any of a PA11, PA6,10, PA6/12 or PA 12 sacrificial outer layer.

3. The coated metal pipe of claim 2, further comprising a nickel plating applied to an inner diameter of said tubing.

4. The coated metal pipe of claim 1 wherein said tubing comprises steel.

5. The coated metal pipe of claim 1, said tubing further comprising any of a copper plated low carbon steel, low carbon steel, stainless steel, or aluminum.

6. The coated metal pipe of claim 1, said intermediate layer further comprising a corrosion inhibiting zinc/aluminum alloy or a corrosion inhibiting magnesium alloy further comprising one or more of aluminum, zinc, manganese, silicon, copper, rare earth metals or zirconium.

7. The coated metal pipe of claim 1, further comprising said intermediate layer being selected from a group consisting of a chrome free conversion coating, primer or primer/adhesive coating, or passivation coating copper coating.

8. A coated metal pipe for use as an automotive fluid transport tube, comprising:

a copper plated carbon steel tubing formed into a circular cross-sectional profile;

at least one intermediate primer layer including a corrosion inhibiting alloy applied over said tubing; and an outer polyamide layer applied over said intermediate layer, said outer layer compounded with an immiscible additive is selected from Ultra High Molecular Weight (UHMW) silicones, and UHMW polyethylene (UHMW-PE), and mixtures thereof at 1-15% by weight.

9. The coated metal pipe of claim 8, said polyamide layer further comprising any of a PA 6/12, PA6/10, PA11 or PA 12 sacrificial outer layer.

10. The coated metal pipe of claim 8, further comprising a nickel plating applied to an inner diameter of said tubing.

11. The coated metal pipe of claim 8, further comprising said intermediate layer being selected from a group consisting of a chrome free conversion coating, primer or primer/adhesive coating, or passivation coating copper coating or a corrosion inhibiting magnesium alloy further comprising one or more of aluminum, zinc, manganese, silicon, copper, rare earth metals or zirconium.

12. A method for manufacturing a coated metal pipe for use as an automotive fluid transport tube, comprising the steps of:

forming a copper plated carbon steel into a tubing exhibiting a circular cross-sectional profile;

forming at least one intermediate primer layer including a corrosion inhibiting zinc/aluminum alloy applied over the tubing; and forming an outer polyamide layer applied over the intermediate layer, the outer layer compounded with an immiscible additive selected from Ultra High Molecular Weight (UHMW) silicones and UHMW polyethylene (UHMW-PE) at 1-15% by weight.

13. The method as described in claim 12, further comprising the step of applying a nickel plating to an inner diameter of the tubing.

14. The method as described in claim 12, further comprising the step of the intermediate layer being selected from a group consisting of a chrome free conversion coating, primer or primer/adhesive coating, or passivation coating copper coating or a corrosion inhibiting magnesium alloy further comprising one or more of aluminum, zinc, manganese, silicon, copper, rare earth metals or zirconium.

15. The method as described in claim 14, further comprising the step of applying the chrome free conversion coating at a thickness of 0.2-04 micrometers.

16. The method as described in claim 12, further comprising the step of the polyamide layer selected from a group consisting of a PA 6/12, PA6/10, PA11 or PA 12 sacrificial outer layer.

* * * * *